Jan. 31, 1967     K. LUNSTROTH     3,300,896
HYDROPONIC GROWTH OF PLANTS
Filed May 10, 1965
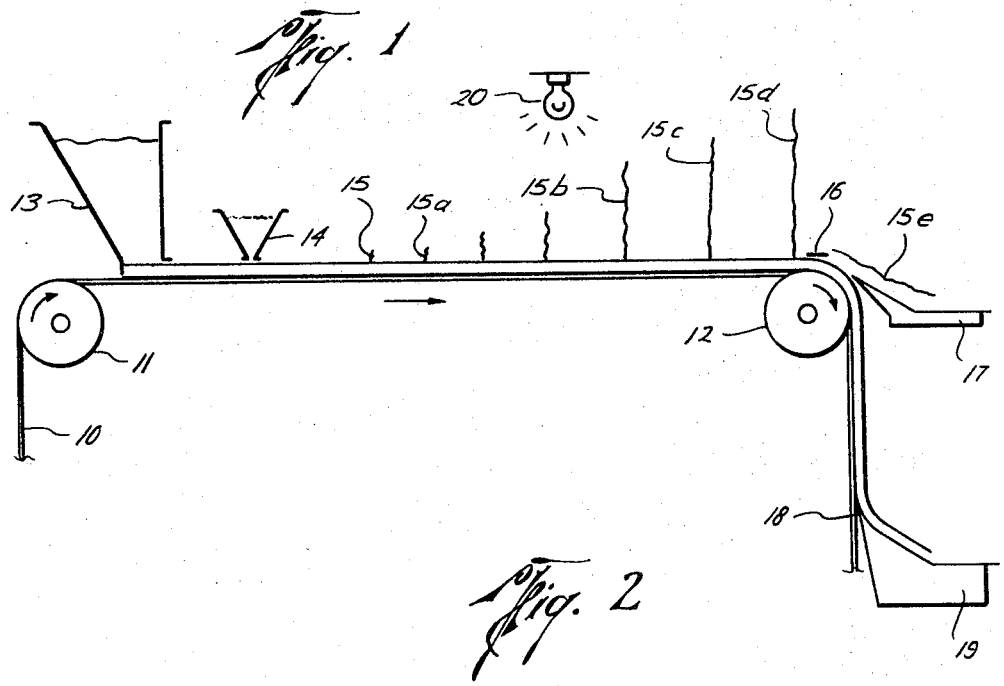
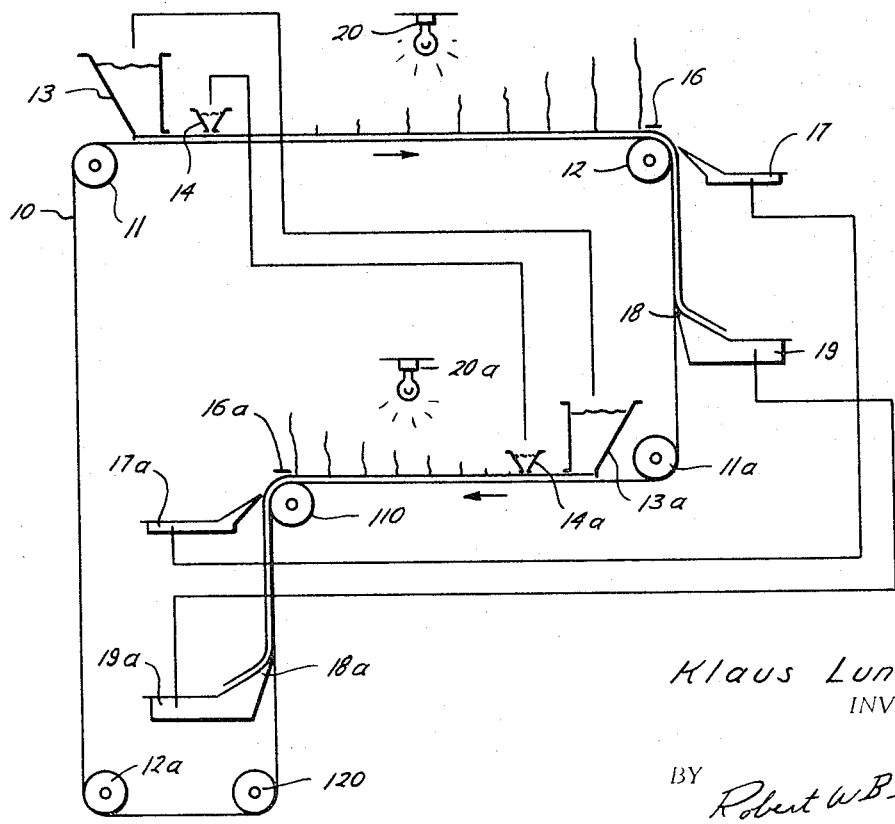
Klaus Lunstroth
INVENTOR.
BY Robert W B Dickinson
ATTORNEY

United States Patent Office 3,300,896
Patented Jan. 31, 1967

3,300,896
HYDROPONIC GROWTH OF PLANTS
Klaus Lunstroth, Houston, Tex., assignor to Research Engineering Co., Houston, Tex., a corporation of Texas
Filed May 10, 1965, Ser. No. 454,447
4 Claims. (Cl. 47—1.2)

This invention relates to the field of hydroponics, namely the growing of plants in an aqueous solution rather than in soil.

A continuing goal of those concerned with food production is the devising of means whereby new or presently utilized edible foodstuffs may be produced or grown in a more efficient manner and in a manner whereby more control over the growing cycle may be exercised resulting in a more uniform product.

This invention generally contemplates the production of germinating foodstuffs, such as legumes for example, by means of placing seeds in a gelatinous clay-containing medium, said medium being contained by and on a movable endless belt. Toward the end of a cycle, the grown plant is severed and separated from the gel medium and may be packaged for use.

Therefore, an object of this invention is the production of a good product in a new and efficient manner.

A further object is to permit the application of continuous production techniques to the hydroponic art.

These and other objects will be obvious on examination of the following detailed description and drawings wherein:

FIGURE 1 depicts, schematically, one cycle of the conveyor operation; and

FIGURE 2 is a diagrammatic representation of a complete belt permitting dual usage thereof.

The subject matter hereinafter considered has proved to be especially successful in connection with the production of bean sprouts but is adaptable for use in the growing of generally any germinating plant. Earlier U.S. patents, including Nos. 2,436,652, 2,814,912, and 2,750,713, have been directed toward creating optimum conditions for sprouting of beans, through the controlling of temperature and humidity. Although these factors are of concern, they are not in and of themselves the characteristics which provide the novelty of this invention.

Although previous attempts have been made to utilize conveyor belts in the cultivation of plants, such as exhibit in U.S. Patents Nos. 2,486,512, 2,971,290, 2,998,351, 3,013,949 and 3,088,881 such previous uses mostly in the area of germinating barley, none have contemplated the use of sodium montmorillonite as a growth medium, permitted dual-cycle usage nor effected a mass production operation as contemplated herein.

FIGURES 1 and 2 depict an endless conveyor belt 10 passing over pulleys 11 and 12. Positioned adjacent pulley 11 is spreader 13. This spreader, or container, is utilized to provide to the conveyor belt the medium utilized to promote growth and support the growing plants. In addition to the expect requirements of availability, inexpensiveness, chemical adequacy and solutility, it is to be noted that the medium to be herein utilized must move along with a moving conveyor and not, of its own accord, flow off the vehicle. The substance found to perform within the bounds of such limitations is a suspension of sodium montmorillonite (Wyoming bentonite) in an aqueous solution containing suitable nutrients, such as sea salt, to provide necessary trace elements. Previous uses for clay of the Montmorillonite group have included assisting in the maturing of barley into malt as described in U.S. Patents Nos. 2,898,270 and 3,066,026. By adjusting the bentonite concentration, sufficient gel strength is obtained whereby the tendency to flow off the belt may overcome. Further, by first dispersing the bentonite in water, and then adding the proper nutrients, maximum gelation occurs with the lowest concentration of bentonite. Experimentally, proper concentration of bentonite has approximated 5% by volume of the aqueous solution. Nutrients added containing .2% Hyponex and .1% sea salt have resulted in plants nine inches tall during an operating cycle of five days. Other media known in the prior art include vermiculite (U.S. Patent No. 3,053,011), any of asbestos, glass or ceramic (U.S. Patent No. 2,486,512), any of burnt clay, pebbles or cinders (U.S. Patent No. 2,220,497) and treated polystyrene (U.S. Patent No. Re. 25,438).

Adjacent to spreader 13 is feed mechanism 14, which deposits seeds, grain or other ovules, as for example bean seeds, into the germinating medium previously placed by spreader 13 on belt 10. While belt 10 may have a span or spread of one hundred feet or more between its extreme pulleys, said belt will move at such a speed as to permit the proper germinating and growth time before the plant reaches pulley 12, whether that be two days or two weeks. Numerals 15, 15a, 15b, 15c and 15d represent the various stages of growth of a plant prior to its reaching the end of a cycle. Plant 15c is shown to have been severed by cutting edge 16. After being severed at a point just at or slightly below its root line, the main body of the plant and a portion of the roots may pass down any convenient surface, and be washed at 17 and be ready for use or packaging. One reason in favor of leaving a small portion of the root attached to the plant body is the experimentally determined fact that if the cut plant is properly packaged and kept moist, then new roots will grow i.e., long shelf-life, as much or more than two weeks, may be obtained.

After severing the grown plant, illustrated as 15e, the conveyor belt 10 is separated from the nourishment medium and detached roots, by knife or severing edge 18, the medium and roots then being washed, as at 19, with the roots being delivered for packaging. The roots may be packaged for such uses as animal feed. The nourishment medium may then be recycled for use, by returning it, perhaps after treatment to spreader 13.

Of course light source 20 may continuously provide light and heat during the growing cycle.

FIGURE 2 illustrates the utilization of the same belt to permit dual usage thereof. After edge 18 separates the root-containing nourishment medium from belt 10, said belt is connected and returned to pulley 10 by the route including pulleys 11a, 110, 120, and 12a. After passing pulley 11a, corresponding to 11, a portion of belt 10 would have the previously described bentonite solution deposited on its upper surface by spreader 13a, and seeds placed thereon by feed element 14a, corresponding respectively to members 13 and 14. Note, however, that opposite belt surfaces are utilized during the respective cycles in this arrangement. After the grown plants proceed to pulley 110, they are severed, as previously described to cutter 16, they are severed at 16a, washed at 17a, and ready for packaging. The remaining roots and the nourishment medium are severed from belt 10 by cutter 18a, the mixture washed at 19a, the root product ready for packaging and the gelatinous mass may be returned to spreader 13a. Belt 10 then winds past pulley 12a to complete the circle to pulley 10. To accommodate this dual cycle operation spreaders 13, 13a, feeders 14, 14a, wash 17, 17a, and wash 19, 19a may be respectively connected.

Experimentally it appears that bean plants will achieve a height of nine inches within five days after initial planting. It is possible to pre-soak or sprinkle dry beans for a period of twelve hours whereby the growth cycle will be shortened by up to twelve hours.

Although this invention has been described with regard to particular configurations, it must be obvious that numerous modifications would be possible by one having ordinary skill in the art without departing from the spirit of the invention, the scope of which is limited only by the following claims in which I claim:

1. A method for the hydroponic growth of plants including the following steps:
   providing a nourishment medium, including a suspension of sodium montmorillonite in an aqueous solution as a constituent thereof, to one surface of a movable belt;
   providing a plurality of objects that may germinate to said nourishment medium; and
   permitting said objects to mature into a food source while moving with said belt.

2. A method of hydroponically growing plants including the following steps:
   providing a nourishment medium to one surface of a movable belt;
   providing a plurality of seeds at intervals to said medium;
   permitting said seeds to mature into plants while moving with said belt;
   separating the plant body along with a portion of the root system in a single operation from said belt and medium; and
   separating the residue of said plants and said medium from said belt after said body and partial root system is separated.

3. The method of claim 2 wherein said nourishment medium is a suspension of sodium montmorillonite in an aqueous solution.

4. The method of claim 2 wherein after said residue and said medium are separated from said one surface of said belt, additional nourishment medium and seeds are provided to the opposite surface of said belt.

References Cited by the Examiner

UNITED STATES PATENTS

| | | | |
|---|---|---|---|
| 1,793,626 | 2/1931 | McCormick | 47—17 |
| 2,358,000 | 9/1944 | Cornell. | |
| 2,971,290 | 2/1961 | Kyle | 47—1.2 |
| 3,141,263 | 7/1964 | Gung-Hsing Wang | 47—14 |

FOREIGN PATENTS 502,668   3/1939   Great Britain.

ABRAHAM G. STONE, *Primary Examiner.*

R. E. BAGWILL, *Assistant Examiner.*